Patented Mar. 29, 1949

2,465,907

UNITED STATES PATENT OFFICE 2,465,907

METHOD OF MAKING LACTEAL FOOD PRODUCTS

Reginald E. Meade and Paul D. Clary, Jr., Appleton, Wis., assignors to Western Condensing Company, San Francisco, Calif., a corporation of California No Drawing. Application June 6, 1945,
Serial No. 597,935

5 Claims. (Cl. 99—54)

1

This invention relates to methods for heat treating milk products while preserving the natural taste and color of the starting material. The invention further pertains to novel milk products distinguished by stability on storage and by capacity of being easily reconstituted to form dispersions that closely resemble natural milk products.

It is known that certain disadvantages and difficulties attend the heat treatment and, in particular, the sterilization and the dehydration, whether complete or incomplete, of liquid lacteal products containing substantial amounts of fat, lactose and protein. Partially dehydrated milk products, such as ordinary condensed milk, have a tan color that has been attributed to caramelization, as well as a noticeable cooked or stale flavor, both due to exposure to elevated temperatures during heating incident to pasteurization, sterilization or concentration of the milk or the like. On storage of such partially dehydrated milk products, an unsightly brown coloration sometimes occurs. Formation of deposits of calcium phosphates or of coarse, grainy or sandy lactose crystals is not unusual. Precipitation of calcium phosphates ("milk stone"), even during the concentration or evaporation, is quite common. Yet some form of heat treatment is an absolute necessity in the manufacture of liquid milk productions on this order in order to insure sterility and to prevent rancidity on storage due to oxidation or other form of deterioration of the fat content of the milk product.

Similar troubles are encountered in the preparation of completely dehydrated milk products, as by spray dying or drum dying. Such complete dehydration is conventionally preceded by evaporation or concentration tending to effect caramelization, development of a cooked or stale flavor and precipitation of calcium phosphates. Like disadvantages attend drum drying. Spray drying without previous concentration yields a product that often turns rancid on storage. Spray dried milk products containing protein and lactose turn brown on storage, whether or not prepared from previously concentrated milk or whey. Neutralization of any acidity noticeable, for instance, in whey, does not prevent objectionable browning on storage.

We have now invented a method for preparing from liquid lacteal products novel compositions that are distinguished by little or no cooked or stale flavor, practically no carmelization, and absence or reduction of brown coloration or rancidity on storage. In the case of those of our novel products that are incompletely dehydrated, there is no deposition of calcium phosphates on storage, and whatever precipitation of lactose, if any, that may occur on storage, takes the form of fine crystals that are easily resuspended by agitation.

Our novel method includes the step of carrying out whatever heat treatment in the liquid phase that may be required for sterilization, for concentration, or for prevention of rancidity, in the absence of a major portion of the mineral and acid content of the original milk from which the final products are derived. In the preparation of partially dehydrated products or merely sterilized products, in particular, in the preparation of canned condensed milk, we provide a liquid concentrate of the fatty constituents of milk, such as cream. We also provide a defatted milk product containing major proportions of the lactose and protein content of milk, for example, whey, and remove a substantial portion of the mineral and acid constituents from such a defatted milk product. The fat concentrate and the defatted product are then thoroughly commingled, as by a homogenizing step, and the resulting mixture is subjected to whatever heat treatment may be required for sterilization, concentration and prevention of rancidity on storage. If desired, the cream or the like may be heat treated before the homogenizing step to stabilize the fat against oxidation or other deterioration leading to rancidity. Either or both of the cream and the demineralized skim milk may be concentrated prior to the homogenizing step.

For the preparation of drum dried milk products, the concentrated product described in the preceding paragraph may be employed.

For the preparation of spray dried products, we provide a concentrate of milk fat, such as cream, and heat treat the same to stabilize the fat against development of rancidity. We also provide a defatted liquid milk concentrate containing major portions of the protein and lactose content from original milk, such as whey, remove a substantial portion of the minerals and acids from said defatted product, combine the fat concentrate and the defatted, demineralized, deacidified milk product, and, preferably after a partial dehydration, spray dry the resulting mixture.

Our preferred method of removing minerals and acid from the defatted milk products to be blended with the milk fat concentrate (as disclosed hereinabove), includes the step of contacting whey or the like with suitable ion exchange and/or absorbent media. For instance, whey may be contacted with a decationizing medium to lower its pH value, for example, to below 2.0, and then contacted with a deacidifying (acid absorbent) medium to raise its pH value, for example, to about 6.0 to 7.5. Alternately sufficient proportions of the whey to be demineralized can be admixed with a cation exchange medium and, after removal of the cation exchange medium, the product can be admixed with a deacidifier. Repeated successive treatment with a decationizer and a deacidifier can be carried out until the desired reduction in the mineral content is obtained. Generally, the ash content should be reduced at least to 3%. Preferably, the ash content of the total solids in the whey should be reduced to 2.0% or less.

Other means of treatment with ion exchangers and deacidifiers will be apparent and include, for instance, alternate percolation of whey or the like through decationizing and deacidifying media, in repeated cycles, without bringing the pH value to the isoelectric point of the whey protein, whereby precipitation of such protein is avoided.

It is therefore an important object of the present invention to provide novel lacteal products characterized by freedom from rancidity and objectionable discoloration on storage, by taste and color essentially like natural milk products, and, in the case of liquid compositions, by absence of objectionable deposits of calcium phosphates and of grainy, sandy lactose particles.

Another object of this invention is to provide methods for heat treating milk products in the liquid phase without effecting caramelization or development of a cooked or stale flavor.

Still another object of the invention is to provide methods for the prevention of objectionable brown discoloration on storage of sterilized or more or less completely dehydrated milk products.

Another object of the present invention is to provide methods for heat treatment of milk products in the absence of a substantial amount of the mineral and acid content of the original milk material.

Other and further objects and features of the present invention will become apparent to those skilled in the art from the following description and appended claims.

An essential step in our methods is that of removing a substantial portion of the mineral and acid content of a liquid defatted milk product, such as whey, prior to any exposure to an elevated temperature. Such a demineralization and deacidification may be carried out concurrently in a manner described hereinbelow as applied specifically to whey.

Ordinary whey obtained, for instance, by rennet treatment of cow's milk may be passed through a bed of or otherwise contacted with a decationizing medium capable of replacing metal ions with hydrogen ions, such as the decationizing media disclosed in the article by Robert J. Myers et al., on pages 697–706 in volume 33 (1941), of "Industrial and Engineering Chemistry." The resinous decationizing media are particularly suitable. Preferably the rate of flow of the whey through the decationizing medium is so regulated that the effluent has a pH of 2.0 or less. The direction of flow is preferably upwardly through the medium, in order to disperse said medium and thereby prevent entrapment of particulate matter.

After exhaustion, the decationizing medium may be revivified by treatment with a dilute acid, for instance, dilute hydrochloric acid.

The decationized whey may then be passed through a bed of, or otherwise contacted with, a deacidifying medium capable of absorbing acids such as one of the "deanionizing" or, more properly, deacidifying absorbent media disclosed in the above identified article by Robert J. Myers et al. Resinous deacidifying media are particularly suitable. Preferably the rate of flow of decationized whey through the deacidifying medium is regulated so that the effluent has a pH value of from 6.0 to 7.5. The direction of flow should be upwardly through the medium, to flush away any precipitate of protein material into a zone of higher pH conditions where the protein is redissolved.

After exhaustion, the deacidifying medium may be revivified by treatment with a dilute alkali solution, for instance, a dilute solution of sodium hydroxide.

It should be understood that a similar reduction of ash content can be obtained by repeated cycles involving sufficient contacts with a decationizing medium and a deacidifying medium, in which cycles the initial reduction of pH value is carried out only, for example, to a value of about 3.8. In other words, the ash removal is distributed between a plurality of cycles, and the whey is not exposed to a very low pH.

The demineralized whey obtained by percolating whey through a decationizing and deacidifying media has a total solids content of which only about 3.0% or less may be ash. The remainder of the total solids content consists principally of 85% lactose and 11.5% non-casein protein.

For combination with whey demineralized and deacidified as described hereinabove to a suitable ash content, for instance, 3% or less (preferably 2% or less) of the total solids content, we provide a milk fat concentrate, such as cream that may have a 12.07% butterfat content. This fat concentrate is heat treated at pasteurization temperature or higher (preferably at 200° to 300° F.), if the final mixture is to be spray dried, in order to prevent development of rancidity in the spray dried product. Examples of such heat treatments are: 300° F. for about ½ minute; 250° F. for about 3 minutes; 200° F. for from 5 to 10 or more minutes. Methods and devices for carrying out such heat treatment are available to those skilled in the art. If the final product is to be only sterilized or only to be partially dehydrated, or drum dried, the above mentioned heat treatment is optional.

The demineralized and deacidified whey is commingled with the eventually heat treated milk fat concentrate, as by a homogenizing step, optionally after a concentration of one or both of the two ingredients of the mixture. The mixture thus obtained, if intended for spray drying, is preferably, but not necessarily, concentrated, for instance, to a 20 to 50% total solids content, by any conventional method. The final spray drying is carried out in any suitable manner and yields a white, relatively non-hygroscopic powder that is extremely easily dispersible in water. On storage, this powder will not turn rancid and will not develop an objectionable brown discoloration.

If the homogenized mixture is only to be sterilized or only to be concentrated, as for canning purposes, the latter procedures are carried out by any suitable conventional method to yield a sterile concentrate free from brown discoloration and characterized by high stability on storage. In particular, brown discoloration, rancidity, precipitation of calcium phosphates or of coarse, grainy or sandy lactose particles will not occur.

The mixed concentrates thus obtained may also be drum dried, with like favorable results.

It is of course possible only to sterilize the above disclosed mixtures at a temperature sufficient to stabilize their fat contents against rancidity, and without much, if any, concentration.

The products obtained as disclosed, whether only sterilized or partially or completely dehydrated, can be diluted or dispersed with water to form reconstituted liquid milk products free from cooked or stale flavors and having an appearance and taste essentially similar to natural milk.

As disclosed in greater detail in our copending application entitled "Novel lacteal products and methods of making the same," Serial No. 597,934, filed June 6, 1945, the demineralized and deacidified ingredient of the mixtures forming one stage in the preparation of the products of the present invention contains substantially the total lactose content of the original whey or skim milk in unchanged form, together with the albumin content of the whey in a modified form which, although still easily and completely dispersible in water, contains relatively a larger fraction precipitated, by trichloracetic acid and is relatively more insoluble at a pH of 4.65 but unchanged with respect to solubility in ½ saturated sodium sulfate solution. For other changes in the composition of lacteal products on treatment with decationizing and deacidifying media, reference is made to said copending application, which also offers an explanation for the advantages flowing from the changed composition.

It is possible, by the methods of the present invention, to prepare from bovine milk lacteal products not heretofore available. We can, for instance, prepare a substantial duplicate of human milk that is characterized by excellent keeping qualities and freedom from cooked or stale odors and that will not turn rancid or brown on storage.

It is well known that cow's milk, as compared with human milk, is relatively low in albumin and lactose and contains relatively large amounts of casein and ash, and therefore is not so readily digested by infants as mother's milk. Numerous attempts have heretofore been made to prepare from cow's milk a duplicate of human milk, but the products heretofore proposed as such substitutes have either failed to duplicate sufficiently closely the composition of mother's milk, or else have been lacking in the necessary keeping qualities.

In preparing a duplicate of human milk, we can take 1000 parts by weight of demineralized and deacidified bovine whey with an ash content amounting to 2% of the total whey solids and commingle this whey with 232 parts by weight of bovine cream containing 12.07% butterfat. The solids content of such cream is calculated as follows:

Cream—12.07% fat

|  | Per cent Liquid | Per cent Dry |
|---|---|---|
| Total solids | 20.00 | 100.00 |
| Casein protein | 2.33 | 11.61 |
| Non-casein nitrogen as protein | 0.80 | 4.00 |
| Lactose | 4.12 | 20.59 |
| Fat | 12.05 | 60.21 |
| Ash | 0.70 | 3.59 |

The composition of the resulting blend will be apparent from the following table:

|  | Weight | Total Solids | Casein Protein | Non-Casein Protein | Lactose | Fat | Ash |
|---|---|---|---|---|---|---|---|
| 12.07% Cream | 232 | 46.5 | 5.4 | 1.86 | 9.57 | 28.0 | 1.67 |
| Demineralized Whey | 1,000 | 55.0 |  | 6.34 | 47.50 |  | 1.10 |
| Total |  | 101.5 | 5.4 | 8.20 | 57.07 | 28.0 | 2.77 |

When the composition of the solids content of the resulting synthesized human milk is recalculated on the basis of 100%, the following composition is obtained:

| Synthesized Human Milk | Per cent Liquid | Per cent Dry |
|---|---|---|
| Total solids | 12.50 | 100.00 |
| Casein protein | 0.67 | 5.32 |
| Non-casein nitrogen as protein | 1.01 | 8.10 |
| Lactose | 7.03 | 56.23 |
| Fat | 3.45 | 27.60 |
| Ash | 0.34 | 2.75 |

For comparison, the average analysis of human milk is tabulated as follows:

| Human Milk—Average Analysis | Per cent Liquid | Per cent Dry |
|---|---|---|
| Total solids | 12.50 | 100.00 |
| Casein protein | 0.68 | 5.4 |
| Non-casein nitrogen as protein | 1.02 | 8.2 |
| Lactose | 7.00 | 56.0 |
| Fat | 3.50 | 28.0 |
| Ash | 0.30 | 2.4 |

It is clear from this table that the synthesized human milk of the present invention has almost the identical composition as human milk.

Cow's milk, on the other hand, has a widely variant composition, as indicated by the following table:

| Cow's Milk | Per cent Liquid | Per cent Dry |
|---|---|---|
| Total solids | 12.50 | 100.00 |
| Casein protein | 2.65 | 31.20 |
| Non-casein nitrogen as protein | .85 | 6.80 |
| Lactose | 4.80 | 38.40 |
| Fat | 3.50 | 28.00 |
| Ash | .70 | 5.60 |

The liquid mixture prepared as described hereinabove and having the same composition, with respect to the solids content, as human milk, may be spray dried, if desired, after concentration to from 20 to 50% total solids content, to yield a spray dried powder distinguished by extreme ease of dispersion in water, so that the original commingled mixture can easily be reconstituted from the spray dried product and water.

If intended for canning as a liquid product, the commingled mixture (which contains 8.23% total solids) is suitably concentrated to a total solids content of 25%, 37.5% or 50%, so that the concentrates can be diluted, respectively, in ratios of 1:1, 1:2 or 1:3, to form a reconstituted liquid product having the same total solids content and composition as mother's milk.

Regardless of which method of those disclosed hereinabove may be employed, the novel infant's food preparations duplicating mother's milk provided by the present invention are far superior for dietetic purposes to natural cow's milk or to any other products heretofore prepared from cow's milk.

Many details of method and composition may be varied within a wide range without departing from the principles of this invention, and it is, therefore, not our purpose to limit the patent granted on this invention otherwise than necessitated by the scope of the appended claims.

We claim as our invention:

1. The method of preparing a stable heat treated bovine milk product suitable for infant feeding and free from cooked or stale flavors which comprises heat treating a fat concentrate of bovine milk at least to pasteurization temperatures for a period of time sufficient to stabilize the fat content thereof against rancidity, contacting with resinous cation and anion exchange mediums a liquid whey containing lactose, ash forming constituents, acid, milk protein and complex milk protein derivative decomposition products forming a part of the total assayable nitrogen of the whey and thereby reducing the content of ash forming constituents of the whey and the content of said decomposition products with an accompanying reduction in assayable total nitrogen, and thereby also modifying the protein content of the whey in such a manner that when the treated liquid whey is spray dried it forms a powder which is readily redispersible in water, and thereafter commingling said heat treated fat concentrate and said thus treated whey in a ratio producing in the resulting mixture the same proportions of fat, lactose, casein protein, non-casein protein, and ash present in human milk.

2. The method of preparing a heat treated liquid milk concentrate free from cooked or stale flavors and capable of prolonged storage without development of rancidity or of objectionable brown discoloration and without precipitation of calcium phosphate or of coarse, sandy, or grainy lactose particles which comprises heat treating cream at from 200 to 300° F. for a time sufficient to stabilize its fat content against rancidity, contacting whey containing lactose, ash forming constituents, acid, milk protein and complex milk protein derivative decomposition products forming a part of the total assayable nitrogen of the material with a decationizing resinous medium and replacing metal ions in said whey with hydrogen ions until the pH of said whey is reduced at least to 2, subsequently contacting said whey with a deacidifying resinous medium and absorbing acids formed by said replacement of said metal ions by hydrogen ions until the pH of said whey is raised to a value between 6 and 7.5 and thereby reducing the content of ash forming constituents of the material and the content of said decomposition products with an accompanying reduction in assayable total nitrogen and thereby also modifying the protein content of the whey to increase the fraction thereof precipitatable by tri-chloracetic acid, thereafter commingling said heat treated cream and said thus treated whey, and concentrating the resulting mixture by evaporation.

3. The method of producing a heat treated fat-containing bovine milk powder free from cooked or stale flavors and capable of prolonged storage without development of rancidity or of objectionable brown discoloration which comprises heat treating cream at temperatures from about 200 to 300° F. for a time sufficient to stabilize the fat content thereof against rancidity, successively flowing through beds of resinous decationizing and deacidifying media liquid whey containing lactose, ash forming constituents, acid, milk protein, and complex milk protein derivative decomposition products forming part of the total assayable nitrogen of the material and thereby reducing the content of ash forming constituents and the content of said decomposition products including peptides and free amino acids and determinable by formol titration, thereafter commingling the heat treated cream and the thus treated whey, and concentrating and drying the resulting mixture to a dried powder which is relatively stable, non-hygroscopic and easily dispersed.

4. The method of preparing a heat treated fat-containing milk product free from stale or cooked flavors and capable of prolonged storage without discoloration or development of rancidity which comprises heat treating a liquid milk fat concentrate at least to pasteurization temperatures for a time sufficient to stabilize the fat content thereof against rancidity, successively flowing through beds of resinous decationizing and deacidifying media liquid whey containing lactose, ash forming constituents, acid, milk protein, and complex milk protein derivative decomposition products forming part of the total assayable nitrogen of the material and thereby reducing the content of ash forming constituents and the content of said decomposition products including peptides and free amino acids and determinable by formol titration, thereafter commingling said heat treated fat concentrate and the thus produced whey product, and heating the commingled mixture at least to pasteurization temperatures.

5. The method of preparing a stable heat treated bovine milk product suitable for infant feeding and free from cooked or stale flavors which comprises heat treating a fat concentrate of bovine milk at least to pasteurization temperatures for a period of time sufficient to stabilize the fat content thereof against rancidity, contacting with resinous cation and anion exchange mediums a liquid whey containing lactose, ash forming constituents, acid, milk protein and complex milk protein derivative decomposition products forming a part of the total assayable nitrogen of the whey and thereby reducing the content of ash forming constituents of the whey and the content of said decomposition products with an accompanying reduction in assayable total nitrogen, and thereby also modifying the protein content of the whey in such a manner that when the treated liquid whey is spray dried it forms a powder which is readily redispersible in water, thereafter commingling said heat treated fat concentrate and said thus treated whey in a ratio producing in the resulting mixture the same proportions of fat, lactose, casein protein, non-casein protein, and ash present in human milk, concentrating the mixture by evaporation, and then drying the concentrate to form a powdered product which is substantially non-hygroscopic and readily dispersible in water.

REGINALD E. MEADE.
PAUL D. CLARY, Jr.

REFERENCES CITED

The following references are of record in the file of this patent:

UNITED STATES PATENTS

| Number | Name | Date |
|---|---|---|
| 985,271 | Merrell | Feb. 28, 1911 |
| 1,341,040 | Bosworth | May 25, 1920 |
| 1,445,434 | Gerstenberger | Feb. 13, 1923 |
| 1,714,597 | Grindrod | May 28, 1929 |
| 1,801,152 | Grasse | Apr. 14, 1931 |
| 2,072,903 | Otting | Mar. 9, 1937 |
| 2,372,233 | Thurston | Mar. 27, 1945 |
| 2,383,070 | Mook | Aug. 21, 1945 |
| 2,404,367 | Durant et al. | July 23, 1946 |